US006377406B1

(12) United States Patent
Hofmann

(10) Patent No.: US 6,377,406 B1
(45) Date of Patent: Apr. 23, 2002

(54) OPTICAL ARRANGEMENT AND THE USE THEREOF

(75) Inventor: Werner Hofmann, Drackendorfer Strasse 18 (DE)

(73) Assignee: Fresnel Optics, Inc., Rochester, NY (US)

( * ) Notice: Subject to any disclaimer, the term of this patent is extended or adjusted under 35 U.S.C. 154(b) by 0 days.

(21) Appl. No.: 09/531,927

(22) Filed: Mar. 21, 2000

Related U.S. Application Data

(63) Continuation-in-part of application No. PCT/DE98/02393, filed on Aug. 11, 1998.

(30) Foreign Application Priority Data

Aug. 26, 1997 (DE) .......................... 197 37 107

(51) Int. Cl.$^7$ .......................... G02B 3/08; G02B 9/04; G02B 21/14
(52) U.S. Cl. .......................... 359/742; 359/741; 359/793; 353/38
(58) Field of Search .......................... 359/742, 741, 359/743, 649–651, 793–795, 831, 837; 353/38, 102

(56) References Cited

U.S. PATENT DOCUMENTS

| 3,334,958 A | 8/1967 | Appeldorn .................. 359/743 |
| 4,436,392 A | 3/1984 | Vanderwerf .................. 353/38 |
| 4,436,393 A | 3/1984 | Vanderwerf .................. 353/38 |
| 4,741,613 A | 5/1988 | Vanderwerf .................. 353/38 |
| 5,568,324 A | * 10/1996 | Nelson et al. ............... 359/742 |
| 5,703,722 A | * 12/1997 | Blankenbecler ............. 359/653 |
| 6,024,452 A | * 2/2000 | Vanderwerf et al. ........ 359/834 |

FOREIGN PATENT DOCUMENTS

| DE | 25 34 483 | 2/1976 |
| GB | 1 258 119 | 12/1971 |
| WO | 99/10760 | 3/1999 |

* cited by examiner

Primary Examiner—Jordan M. Schwartz
(74) Attorney, Agent, or Firm—Hamilton, Brook, Smith & Reynolds, P.C.

(57) ABSTRACT

The invention relates to an optical arrangement comprising at least two optical elements, such as Fresnel lenses or linear prism sheets arranged with their structured surfaces pointing toward one another, and to the use thereof for various projectors and displays. The solution according to the invention seeks to reduce light losses and allows a large intercept distance on one side. This object is achieved by the active edges of the two optical elements that are designed and oriented with respect to one another in such a way that light enters or emerges from the active edges of one of the two optical elements at least in a virtually orthogonal manner.

23 Claims, 3 Drawing Sheets

OPTICAL ARRANGEMENT AND THE USE THEREOF

RELATED APPLICATIONS

This application is a continuation-in-part of International Application No. PCT/DE98/02393, filed on Aug. 11, 1998, designating the United States, which claimed priority to German Application 19737107.8 on Aug. 26, 1997. The teachings of each application are incorporated herein by reference.

BACKGROUND OF THE INVENTION

The formation of single-sided groove structures, as have long been used in Fresnel lenses, makes it possible to provide lenses which achieve short intercept distances with a planar design and a large relative aperture. In this embodiment, the thickness of the Fresnel lenses is virtually constant across the diameter. The groove structure is formed by a sequence of concentric active edges which effect the imaging. The technology dictates that disturbing edges are present between the individual active edges, which disturbing edges lead to undesirable light losses and a corresponding ring structure becomes discernible in the imaging. This is the case particularly when the light is directed onto the plane surface of the Fresnel lens.

The deflecting effect can then be utilized only until total reflection occurs at the active edges. If the light were deflected to a great extent, further light losses always occur due to surface reflections according to Fresnel's equations, which also lead to partial polarization of the light.

SUMMARY OF THE INVENTION

Fresnel condensers having two Fresnel lenses are used in overhead projectors. In this embodiment, the structured surfaces of the Fresnel lenses are opposite one another, such as as shown in FIG. 1. As a result of the short finite back and front focal distances compared with the free aperture of the Fresnel condenser, the refractive power has to be shared between two lenses. In this embodiment, between the two Fresnel lenses, the light rays run parallel, but at the very least virtually parallel to the optical axis.

For liquid crystal display (LCD) projectors, the solution known for overhead projectors was initially resorted to and, in the simplest case, the LCD panel was placed onto such a projector. For good to optimal projection conditions, a virtually perpendicular incidence of light over the entire area, to be projected, of such an LCD display is necessary for good color rendition and high contrast. For this reason, the LCD was transilluminated virtually perpendicularly using a condenser system. The condenser system comprises a Fresnel lens and a conventional glass condenser lens stranding near the lamp. A second Fresnel lens is arranged as a field lens after the LCD display, which lens images the light source in the entrance pupil of the projection lens. A conventional Fresnel lens was used as the field lens and brings about the light losses already mentioned.

The object of the invention includes an optical arrangement using Fresnel lenses which has reduced light losses and allows a large intercept distance on one side. The optical arrangement includes at least two Fresnel lenses which are each structured on one side and the structured surfaces are arranged such that structured surfaces point toward one another. Although Fresnel lenses are exemplified, other types of optical elements can be used, such as linear prisms. The active edges of the two Fresnel lenses are oriented with respect to one another in such a way that, in the event of parallel light incidence on, or light emergence from, a plane surface of one of the two Fresnel lenses. The refractive powers are divided between two surfaces and light deflection is effected only at two of the four surfaces of the two Fresnel lenses.

According to the invention, an arrangement formed from two lenses each with a Fresnel structure formed on one side is used. The Fresnel structures of the lenses are directed toward one another. In this embodiment, one of the two Fresnel lenses is designed and oriented with respect to the other lens in such a way that the light entering or emerging from its active edges enters or emerges at an angle which is at least virtually a right angle.

In order to further reduce the light losses, the disturbing edges of this Fresnel lens should form an angle of approximately ninety degrees with the associated active edges. It is important that only two of the four surfaces through which the light enters or emerges make a significant contribution to the deflection of the light. The light rays do not run parallel to the optical axis.

As a result, it is possible, surprisingly, not only to increase the luminous efficiency but also to suppress the imaging of the Fresnel structure. Moreover, the scattered light component and reflection losses can be reduced. Depending on the side of the optical arrangement according to the invention at which light enters, a virtually infinite front or back focal distance can be achieved. If such an arrangement is used in accordance with the conventional Fresnel condenser in an overhead projector, a virtually infinite front focal distance is achieved if virtually parallel light is radiated in.

The spacing of the Fresnel structures of the arrangement according to the invention should be as close as possible in order to achieve a short structural length and, if appropriate, to connect the Fresnel lenses to one another in order, in this manner, to protect the Fresnel structures against dust and mechanical damage. The alignment of the two Fresnel lenses with respect to one another is not as critical as in the case of a conventional overhead projector lens, because the light is virtually perpendicularly incident on the active edges of the second Fresnel lens.

If the invention is used for overhead projectors, it is expedient to design the two Fresnel lenses to be slightly bent or to hold or arrange said lenses in a slightly bent position in order to improve the uniformity of the image field illumination and increase the mechanical stability. Moreover, it is possible to reduce light losses due to surface reflection by virtue of the smaller angles of incidence at the surfaces. This can further be improved by an antireflective surface or coating, where conventional coatings or layer systems can be used for this purpose or other reflection-reducing methods can be employed, such as subwavelength structures (for example, moth-eye structures), for this purpose.

In certain embodiments it may be expedient to produce the two Fresnel lenses from different materials, that is to say with different refractive indices. In this embodiment, the deflection of the light may be influenced in addition to the angles at which the active and disturbing edges of one Fresnel lens are formed. The active and disturbing edges of the Fresnel lens which deflects the light at the active edges are meant in this embodiment.

By dividing the refractive powers between two surfaces, it is possible to avoid the limitation of the maximum deflection by total reflection, as occurs according to the prior art, if the light from the light source impinges on a plane surface of one of the two Fresnel lenses.

The arrangement according to the invention can be used equally as a converging lens or diverging lens. Moreover, a combined use with a further optical element which can be arranged in the beam path of the light is readily possible and additional diverse applications are opened up in accordance with the respective optical element. Such optical elements may be, e.g., prisms, such as linear prisms, beam splitters, cylindrical lenses or lenticular lenses. An additional Fresnel lens may expediently be used as such an optical element, which lense may be arranged parallel to the two Fresnel lenses.

The invention may be used particularly advantageously in overhead projectors, in LCD projectors or other displays, such as e.g. back projectors, video projectors (cathode ray tube (CRT) or LCD), laser display projectors, but also in array arrangements of such projection systems (Video-Walls), the known disadvantages being avoided to the greatest possible extent.

Figure 1:
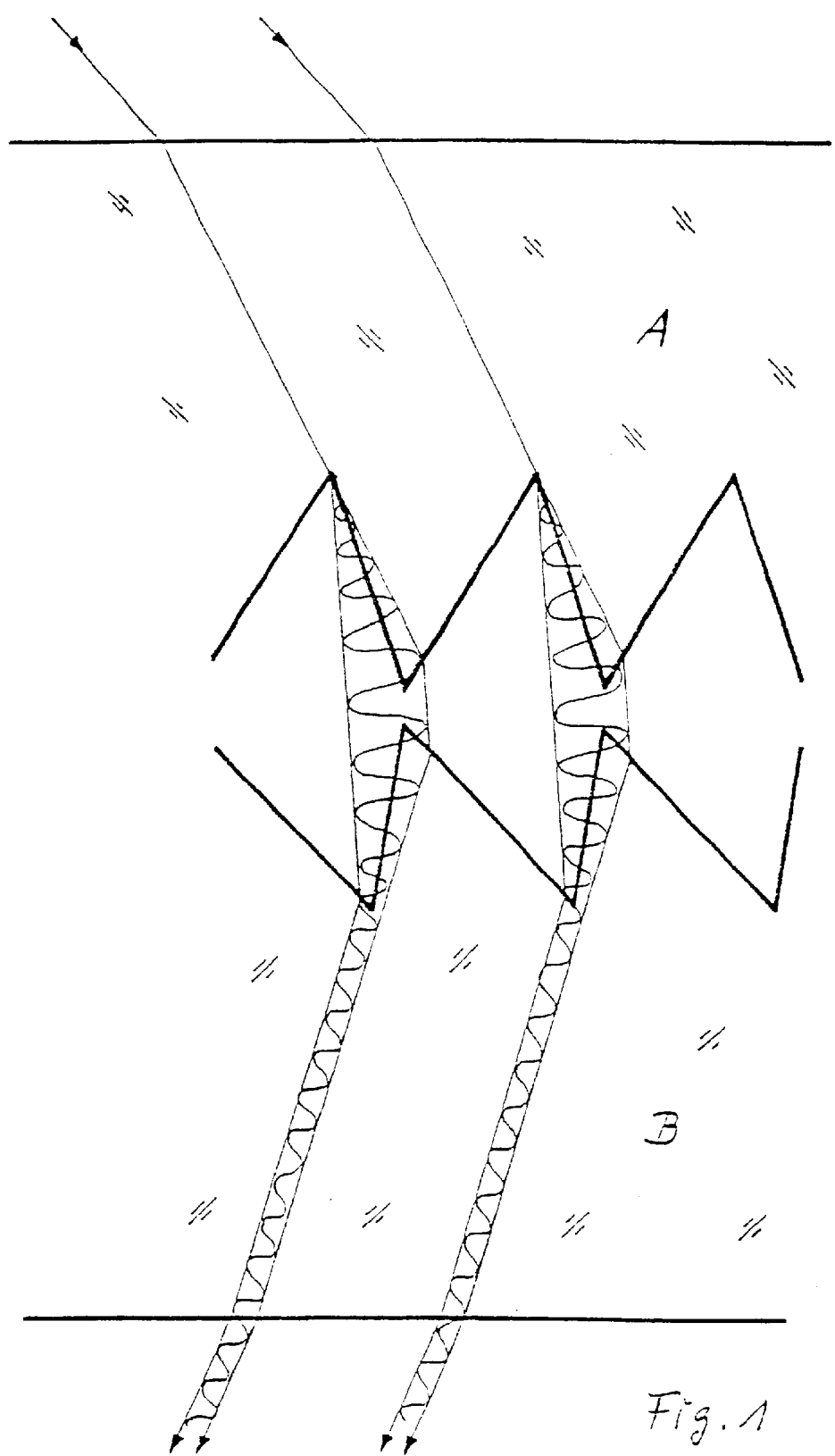
FIG. 1 shows a known arrangement of two Fresnel lenses.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention. All parts and percentages are by weight unless otherwise specified.

DETAILED DESCRIPTION OF THE INVENTION

As shown in FIG. 1, an arrangement of two Fresnel lenses A and B in a conventional embodiment, light enters the plane surface of the Fresnel lens A and is refracted at its active edges and the active edges of the second Fresnel lens and additionally at the plane surface of the second Fresnel lens B, that is to say it is refracted a total of four times. The light is guided between the two Fresnel surfaces in this embodiment virtually parallel to the optical axis.

Figure 2:
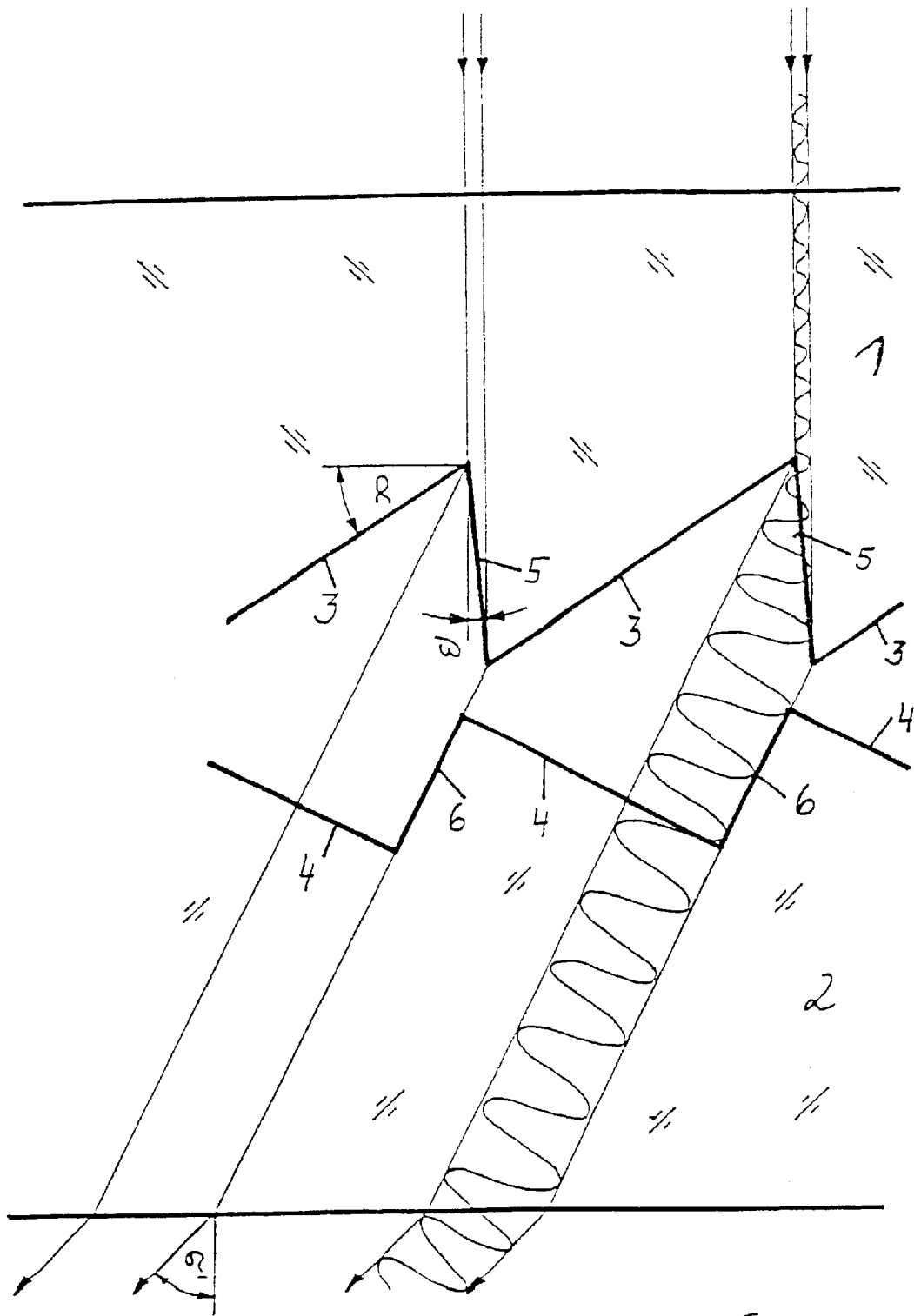
FIG. 2 shows an example of an arrangement according to the invention.

In contrast to this, in an embodiment according to the invention as illustrated in FIG. 2, two different Fresnel lenses 1 and 2 are used which, in this example, are composed of polymethyl methacrylate (PMMA) and have a refractive index of n=1.493. In this embodiment, the active edges 3 and 4 of the two Fresnel lenses 1 and 2 are designed and arranged in such a way that the light enters the active edges 4 at least in a virtually orthogonal manner and, accordingly, deflection fails to occur at these edges. In this example, the light is deflected only at the plane surface of the second Fresnel lens 2 and the active edges 3 of the first Fresnel lens 1.

In this embodiment, the light impinges on the plane surface of the first Fresnel lens 1 in a virtually parallel manner. The active edges 3 are inclined by an angle of $\alpha=37.7°$ relative to the plane surface of the Fresnel lens 1. The disturbing edges 5 are inclined at an angle of $\beta=3°$ relative to the optical axis, in order to allow the lens to be released from the mold.

It becomes clear, furthermore, in FIG. 2 that the active and disturbing edges 4 and 6 of the second Fresnel lens 2 are oriented orthogonally with respect to one another and the previously accepted light losses can thereby be reduced at least to a great extent. The angles for the active edge and disturbing edge are thus equal to the inclination of the beam inclination and are 28.3 degrees. The angles specified produce a beam deflection of $\sigma'=45$.

In the embodiment and light guidance shown in FIG. 2, a virtually infinite front focal distance is achieved. If the light guidance were reversed in contrast to this, it is possible to achieve a virtually infinite back focal distance employing the same arrangement. The example can be further improved, in a form that is not illustrated, if an additional conventional Fresnel lens is arranged with its Fresnel structure pointing toward the plane surface of one of the two Fresnel lenses 1 or 2 illustrated.

Moreover, the invention can be used for eliminating the "keystone" effect known from conventional overhead projectors. This is achieved in a known manner by correspondingly displacing the projection lens laterally with respect to the optical axis in the direction of the projected area. In this embodiment, the illumination system has to be changed in such a way that the light source is imaged again in the entrance pupil of the projection lens used off axis. A number of options for this purpose include such as e.g. the inclination of the entire illumination system, the lateral displacement of the two Fresnel lenses with respect to one another, or the use of additional optical elements.

In the simplest solution, the mutual displacement of the two Fresnel lenses, the procedure is such that the Fresnel lens facing the light source maintains its position, while the other Fresnel lens, depending on the "keystone" angle to be corrected and this displacement of the projection lens that is necessary as a result is likewise displaced laterally and in the direction of the projection lens.

In known arrangements in accordance with FIG. 1, however, it has been found that a moiré is produced. The illustration in accordance with FIG. 1 is an optimal alignment of the two Fresnel structure. It is only by this means that it is possible for the light to be transmitted virtually completely. The homogeneous light pencil which enters at the first Fresnel lens A is split into concentric bright and dark light tubes at the first Fresnel surface, these bright, light-guiding pencils being taken up by the active edges of the second Fresnel lens and spread again. If there is a slight offset between the two Fresnel structures, it is possible for light to fall onto the disturbing edges of the second Fresnel lens and thus be lost for the imaging.

In the case of the above-mentioned displacement of the Fresnel lenses in order to change their spacing from one another, there is inevitably produced regions where the active edges of the first and second Fresnel lenses are opposite one another. The light is transmitted completely and other regions in which active edges of the first Fresnel lens and disturbing edges of the second Fresnel lens are opposite one another. Since the width of the bright and dark light tubes is almost identical at the edge, almost all the light falls onto disturbing edges and is lost.

Figure 3:
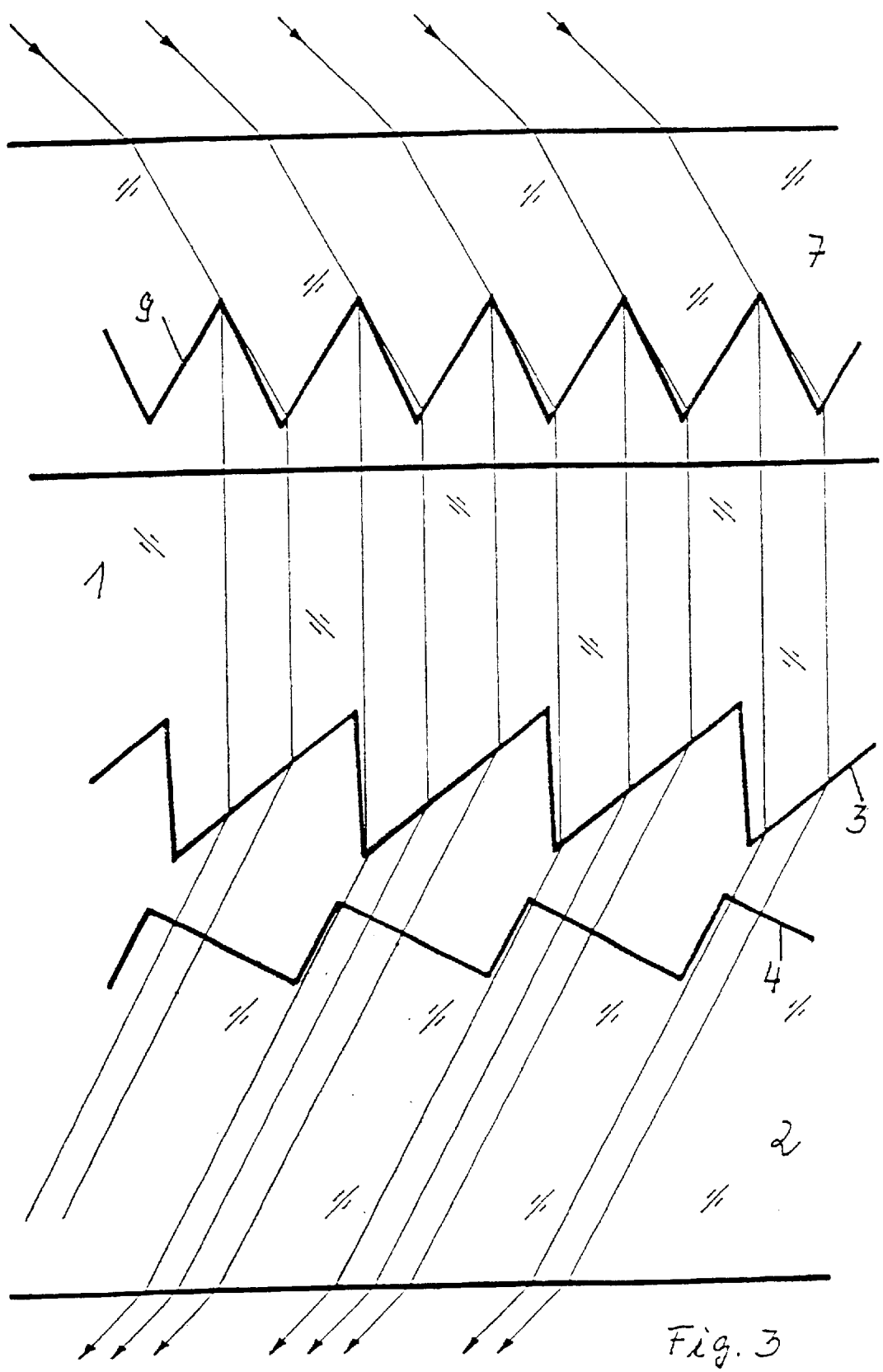
FIG. 3 shows an arrangement according to FIG. 2 supplemented by an additional Fresnel lens.

If this arrangement is now supplemented by an arrangement as shown in FIG. 3, even though the light is greatly structured by the first Fresnel lens 7, nevertheless the light can be transmitted virtually completely and the moiré effect can be considerably reduced. The alignment accuracy of the individual lenses 1, 2 and 7 with respect to one another can be considerably reduced by means of the invention. Moreover, further measure, such as, e.g. different groove widths of the Fresnel structures or a reduced spacing of the first Fresnel lens 7 form the arrangement of the two Fresnel lenses 1 and 2, can be utilized in order further to suppress the visibility of the groove structures during imaging.

The example, as illustrated in FIG. 3, of an arrangement according to the invention with two Fresnel lenses 1 and 2 which has been supplemented by an additional Fresnel lens 7 discloses how the light directed on to the Fresnel lens 7 is deflected at its plane surface and its active edges 9 and is deflected again by the plane surface of the Fresnel lens 1, at the active edges 3 thereof, and is directed in a virtually orthogonal manner onto the active edges 4 of the Fresnel lens 2 and is deflected again when emerging from the plane surface of this Fresnel lens 2. In this embodiment, the active edges 9 of the Fresnel lens 7 are shorter than the active edges 3 of the central Fresnel lens 1 and, moreover, are angled more steeply.

While this invention has been particularly shown and described with references to preferred embodiments thereof, it will be understood by those skilled in the art that various changes in form and details may be made therein without departing from the scope of the invention encompassed by the appended claims.

What is claimed is:

1. An optical arrangement comprising at least two optical elements which each have an optically structured surface on one side and each optical element includes a planar surface, active edges, and disturbing edges and the structured surfaces are arranged such that the structured surfaces face toward one another, wherein the active edges of the two optical elements are oriented with respect to one another in such a way that, in the event of parallel light incidence on, or parallel light emergence from, the planar surface of one of the two optical elements, the refractive powers of the two optical elements are divided between only two surfaces and light deflection is effected only at two of the four surfaces of the two optical elements, wherein a plurality of disturbing edges of one of the optical elements are substantially parallel to light that has passed through the other optical element.

2. The optical arrangement of claim 1, wherein the optical elements are selected from a group consisting of Fresnel lenses and linear prisms sheets.

3. The optical arrangement of claim 1, wherein the active edges and the disturbing edges of one optical element form an angle of about ninety degrees.

4. The optical arrangement of claim 1, wherein the surfaces of the optical elements include antireflection surfaces.

5. The optical arrangement of claim 1 wherein the refractive indices of the materials of the optical elements are different.

6. The optical arrangement of claim 1, wherein additional optical elements are arranged upstream or downstream in the beam path.

7. The optical arrangement of claim 1, wherein a Fresnel lens is arranged parallel to the two optical elements.

8. The optical arrangement of claim 1, wherein the optical elements are bent.

9. An overhead projector having an optical arrangement of claim 1.

10. An LCD projector having an optical arrangement of claim 1.

11. The optical arrangement of claim 1 included in a display projector, a visual display projector or an array arrangement of projection systems.

12. A backlight for a LCD which includes the optical arrangement of claim 1.

13. An optical arrangement comprising at least two Fresnel lenses which each have an optically structured surface on one side and each lens includes a planar surface, active edges, and disturbing edges and the structured surfaces are arranged such that the structured surfaces face toward one another, wherein the active edges of the two Fresnel lenses are oriented with respect to one another in such a way that, in the event of parallel light incidence on, or parallel light emergence from the planar surface of one of the two Fresnel lenses, the refractive powers of the two lenses are divided between only two surfaces and light deflection is effected only at two of the four surfaces of the two Fresnel lenses, wherein a plurality of disturbing edges of one of the lenses are substantially parallel to light that has passed through the other lens.

14. The optical arrangement as claimed in claim 13, wherein the active edges and the disturbing edges of one Fresnel lens form an angle of about ninety degrees.

15. The optical arrangement of claim 13, wherein the surfaces of the Fresnel lenses have antireflection surfaces.

16. The optical arrangement of claim 13 wherein the refractive indices of the materials of the Fresnel lenses are different.

17. The optical arrangement of claim 13, wherein additional optical elements are arranged upstream or downstream in the beam path.

18. The optical arrangement of claim 13, wherein an additional Fresnel lens is arranged parallel to the two Fresnel lenses.

19. An optical arrangement comprising at least two linear prism sheets which each have an optically structured surface on one side and each sheet includes a planar surface, active edges, and disturbing edges and the structured surfaces are arranged such that the structured surfaces face toward one another, wherein the active edges of the two linear prism sheets are oriented with respect to one another in such a way that, in the event of parallel light incidence on, or parallel light emergence from, the planar surface of one of the two linear prism sheets, the refractive powers of the two sheets are divided between only two surfaces and light deflection is effected only at two of the four surfaces of the two linear prism sheets, wherein a plurality of disturbing edges of one of the sheets are substantially parallel to light that has passsed through the other sheet.

20. The optical arrangement of claim 19, wherein the surfaces of the linear prism elements include antireflection surfaces.

21. The optical arrangement of claim 1, wherein a plurality of active edges of one of the optical elements is substantially perpendicular to light that has passed through the other optical element.

22. The optical arrangement of claim 13, wherein a plurality of active edges of one of the lenses is substantially perpendicular to light that has passed through the other lens.

23. The optical arrangement of claim 19, wherein a plurality of active edges of one of the sheets is substantially perpendicular to light that has passed through the other sheet.

* * * * *